United States Patent Office 3,554,031
Patented Jan. 12, 1971

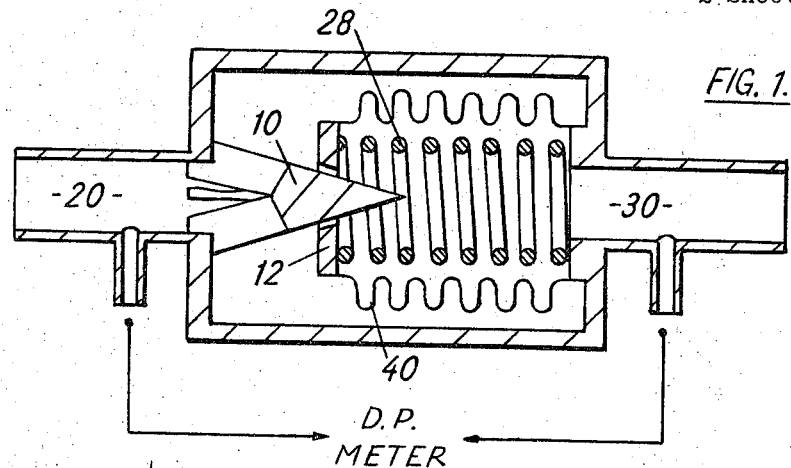
FIG. 1.
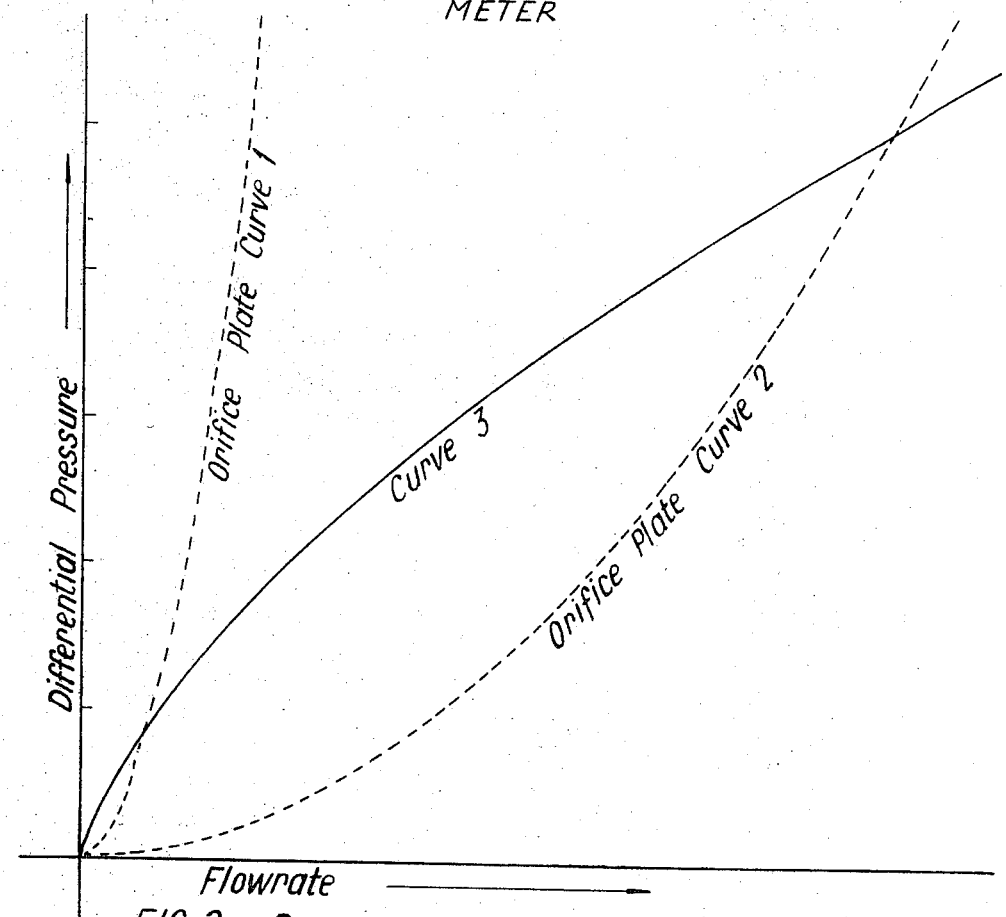
FIG. 2. Response curves of two sizes of orifice plate compared with a wide range Flowmeter of the Invention.

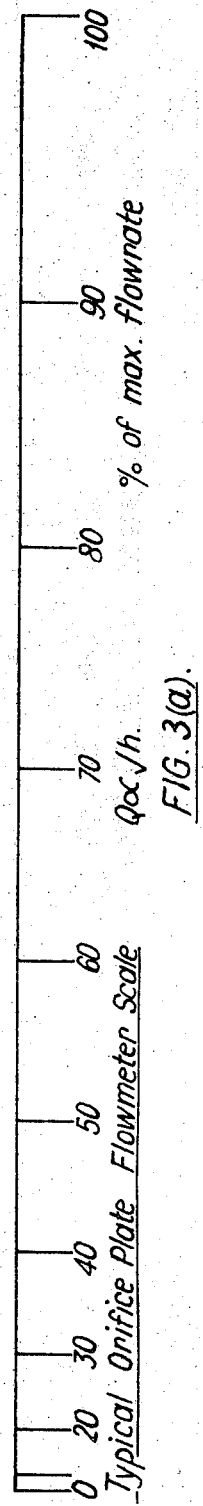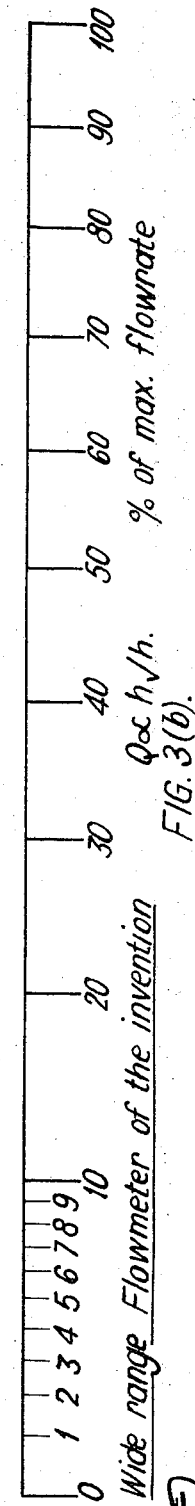

3,554,031
FLOW RATE METER
David Turner, London, England, assignor to Gervase
Instruments Limited, a British company
Filed June 11, 1968, Ser. No. 736,123
Int. Cl. G01f 1/00
U.S. Cl. 73—210                                    2 Claims

ABSTRACT OF THE DISCLOSURE

The invention relates to a flow rate meter which gives an indication of the flowrate dependent upon the differential pressure across, or the upstream pressure of a measuring orifice. The size of the orifice is varied by a control member, the position of which relative to the orifice is used to provide the indication of the flowrate. The meter is neither of the constant-pressure-drop type, nor of the constant-area type as the area of the orifice depends upon the position of the control member.

---

This invention relates to fluid flow rate meters and controllers.

Hitherto flow rate meters have employed one of two possibilities, namely the area of flow may be constant and the pressure differential used for flow measurement, or the area may be varied and the pressure differential maintained constant. The former method is used in flowrate measurement by means of an orifice type instrument such as the venturi meter, and the latter is used in a constant pressure differential device, such as the conical tube and float type.

In a flow rate meter according to the invention, the pressure at one side of, or the differential pressure across, a measuring orifice through which the fluid flows in its passage through the meter acts to position an orifice plate relative to a control member which is shaped and disposed in relation to the orifice in such a way that the cross sectional area of the orifice open to fluid varies in accordance with variations in the differential pressure.

The control member may have a shape such that its cross sectional area varies along its length and be arranged to move axially with respect to the orifice to vary the area of the latter, or alternatively may comprise a simple gate or valve element arranged to move in such a way that the area of the orifice will vary in accordance with variations in the inlet or differential pressure.

Thus, both the area of flow and the pressure across the orifice are varied in a definite relationship with each other, in comparison with conventional flow rate meters in which only one of these two parameters is allowed to vary.

A reading of the flow rate can be derived from the relative position of the control member and the orifice. The flow rate is determined from the pressure drop across the orifice.

In most cases the relationship between orifice area and pressure differential produced by the use of a conical control member and a circular orifice will be satisfactory. The area of the orifice, for small displacements of the control member, is then substantially proportional to the differential pressure. By selecting an appropriate shape for the control member it is possible to render it exactly so over the total range of travel of the control member. In this case the flowrate is proportional to $h^{1\frac{1}{2}}$, where $h$ is the differential pressure. This produces a good response at low flow rates without giving unmanageably large pressure differentials at high flow rates. By a small change in the shape of the control member it is possible to make the orifice area proportional to the square root of the differential pressure, in which case the response is linear from zero flow rate to the maximum.

The differential pressure can be arranged to act on the orifice plate, and a rate spring or the like can be incorporated to urge the orifice plate into its closed position.

A flow rate meter according to the invention has a number of important advantages over the conventional types of flow rate meter such as the venturi meter or the conical tube and float type. It is compact and robust, and does not require a substantial length of straight pipe on either side of it as in the case of a venturi meter, neither is it fragile as a conical tube and float type. It can be arranged to give a direct physical indication of the flow rate, which may be indicated on a scale or recorded on a graph or both. A further feature of the flow rate meter is that in operation it acts as an effective non-return valve.

In cases where the pressure differential across the orifice is measured to indicate the flow rate there is no mechanical connection between the control member and the measuring instrument at all.

A further feature of the flow rate meter is that its response is rapid without oscillation, and is substanitally linear, or can be made to be linear, over a wide range.

The flow rate meter is suitable not only for liquids of widely varying viscosities, but also for all types of gases.

The invention will now be further described by way of example with reference to the accompanying drawings, in which:

FIG. 1 shows a flow rate meter in which the flow rate is determined from the pressure drop across the orifice;

FIG. 2 is a graph showing the response of a flow rate meter in accordance with the invention in comparison with a conventional orifice type flow rate meter; and FIG. 3 shows typical scales characteristic of an orifice type flow rate meter ($a$), and a flow rate meter in accordance with the invention ($b$).

In the embodiment shown in FIG. 1 a conical control member 10 is fixed at the inlet 20 to the flow rate meter, and the orifice 12 is formed in a plate 24 supported by bellows 40 and urged by means of a rate spring 28 to the position in which it reduces the area of the orifice open to flow.

As the inlet pressure increases, the orifice plate 24 is moved to the right as seen in the diagram, against the action of the rate spring 28, to increase the size of the orifice. The orifice plate will find an equilibrium position in which it causes a drop in the fluid pressure related to the fluid flow rate. This pressure drop is measured by a differential pressure meter connected between the inlet 20 and outlet 30 of the flow rate meter. The differential pressure meter, which in its simplest form may be a manometer, may be calibrated to indicate the flow rate directly in, for example, cubic feet per second, or gallons per minute.

In its rest position (zero flow rate) the orifice 12 is completely closed. Fluid entering the inlet 20 causes the orifice plate 24 to move away from the control member 12 against the resistance of the rate spring 28, and so open the orifice. Fluid then flows through the orifice 12 to the outlet causing a pressure drop which is proportional to the opening of the orifice which in turn is dependent upon the flow rate.

The characteristics of the flow rate meter may be altered substantially by replacing the conical control member by a member of another shape such as a paraboloid or a cylinder having a tapered V groove or slot milled along its length. Alternatively it is possible for the control member to have the form of a sliding gate or an iris diaphragm or the like.

If the flow rate meter is to act as a controller which is activated by a high flow rate of fluid, or conversely by a low flow rate of fluid, the control member may be made in a stepped form so that one step on the member can accommodate all the safe working flow rates, and as soon as the flow rate increases or falls outside the predetermined range a large movement of the member results. This movement can be used to activate, for example, a microswitch or a pilot valve in a compressed air system.

For any given flow rate the orifice plate assume a unique position relative to the control member so that the pressure required to maintain the flow through the orifice 12 is balanced by the thrust of the rate spring 28 on the opposite side of the orifice plate 24. Any alteration of the position of the orifice plate is resisted by a change in the pressure and a change in the area of the measuring orifice, each of which reinforces the other. This results in very stable operation.

The orifice plate can be made any desired size so that a small differential pressure is obtained across the orifice. The errors produced by friction are thus small in proportion.

Taking the expression for the flow rate Q through an orifice of area A as $Q=h^{1/2}KA$, where K is a constant and $h$ is the differential pressure across the orifice, the response curve for an orifice plate can be plotted. Two such curves, for orifice plates of different sizes, are shown in FIG. 2.

It can be seen that if a plate is chosen to give readable differential pressures at low flow rates (curve No. 1), the pressures will become unacceptably high at high flowrates. Conversely, if a plate is chosen to give reasonable differential pressures at high flow rates, the response at low flow rates is so low that it cannot be accurately measured (curve 2).

However, if the orifice is made in such a way that its area is always proportional to the differential pressure, then $h$ may be substituted in the expression above in place of A, and the expression becomes $Q=h^{1/2}Kh$, or more simply $Q=h^{1 1/2}K$.

The response curve of the flow rate meter of the invention, when fitted with a conical plug working in a circular orifice plate, is also plotted in FIG. 2 as curve No. 3. It can be seen that it gives easily readable differential pressures at both large and small flow rates. The practical consequence of the difference is shown clearly in FIG. 3, which shows at (a) and (b) the scale graduations of the orifice plate flow rate meter in comparison with those of a flow rate meter of the invention. The great improvement in the accuracy with which flow rates below about 10% of maximum can be read is readily apparent.

It is possible to measure low rates of flow by using a measuring orifice. Changes in the range of flow rates covered by one instrument may be made by varying the rate of taper of the cone, or the strength of the rate spring, or both.

I claim:
1. A flow rate meter comprising a housing having a fluid inlet and a fluid outlet, two fluid pressure taps, one of said pressure taps located in said fluid inlet and the other located in said fluid outlet, a tapered control plug fixed to the inside of the housing adjacent said fluid inlet and in line with the axis of said fluid inlet, a movable orifice plate having an orifice opening which fits about said tapered plug, the effective area of said orifice opening is determined by the position of said orifice opening relative to said control plug, spring biasing means provided to bias said orifice plate against said control plug thereby tending to close said orifice opening against said control plug, said biasing means exerting a force proportional to the difference in pressure between said inlet and outlet fluid pressure taps, a bellows means surrounding said spring biasing means and attached at one end to the orifice plate and the other end attached to the housing in such a manner as to surround the periphery of said fluid outlet, said bellows means thereby forming a fluid channel for permitting the fluid to flow in an ordered fashion once past the orifice opening to said fluid outlet, and means connected to said pressure taps for measuring the pressure difference developed between said fluid inlet and outlet of said meter, as said pressuring difference is functionally related to the fluid flow rate through the meter, and can be calibrated to provide an indication of the flow rate in either volumetric or mass flow units.

2. A flow rate meter according to claim 1 wherein said tapered control plug varies in cross-sectional area along its length so that the pressure difference across said orifice plate is directly proportional to the flow rate through the meter.

References Cited
UNITED STATES PATENTS

| 1,187,607 | 6/1916 | Carney et al. | 73—209 |
| 2,769,337 | 11/1956 | Rich | 73—206 |

FOREIGN PATENTS

| 812,236 | 5/1937 | France | 137—510 |
| 1,062,443 | 7/1959 | Germany | 73—207 |

JAMES J. GILL, Primary Examiner

M. SMOLLAR, Assistant Examiner